T. MILLER.
BOLT AND NUT THEREFOR.
APPLICATION FILED OCT. 28, 1913.

1,154,265.

Patented Sept. 21, 1915.

Witnesses:
Jas. Hutchinson
G. Wedemeier

Inventor
Thomas Miller
By
Beam Milans, Attorney

UNITED STATES PATENT OFFICE.

THOMAS MILLER, OF CRAIG, MISSISSIPPI.

BOLT AND NUT THEREFOR.

1,154,265.  Specification of Letters Patent.  Patented Sept. 21, 1915.

Application filed October 28, 1913. Serial No. 797,764.

*To all whom it may concern:*

Be it known that I, THOMAS MILLER, citizen of the United States, residing at Craig, in the county of Yazoo and State of Mississippi, have invented certain new and useful Improvements in Bolts and Nuts Therefor, of which the following is a specification, reference being had therein to the accompanying drawing.

This invention relates to improvements in a bolt and nut structure, and has for its primary object the provision of improved interlocking instrumentalities between the bolt and a sleeve member to prevent relative movement of either the bolt or sleeve with respect to the other; providing a structure whereby stripping of the threads of the bolt is practically eliminated.

With the foregoing object in mind, the preferred embodiment of the invention comprises a bolt provided with a sleeve secured to rotate therewith, said sleeve being formed, in turn, to receive the nut and interlocking parts carried by the nut and having keyways therefor adapted to register with keyways in the bolt, and the positioning of a locking key in said key-ways to prevent relative movement of the bolt and sleeve permitting the nut to be screwed home relative to the bolt secured thereby.

The above stated embodiment of the invention is illustrated in the accompanying drawings forming a part hereof, and the details of construction and arrangements of parts will be apparent from an inspection of the said drawings when read in connection with the specific description thereof hereinafter contained.

Figure 1:
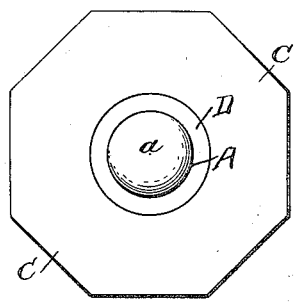
Figure 2:
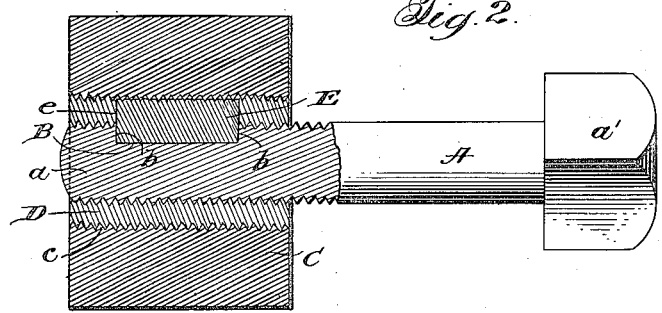
Figure 3:
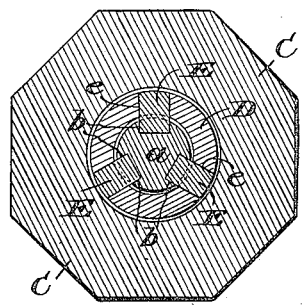

In the drawings:—Figure 1 is an end view of the complete device with the sleeve in locked position on the bolt; Fig. 2 is a longitudinal sectional view, and Fig. 3 is a transverse sectional view.

Referring more specifically to the drawings, wherein like reference letters designate corresponding parts in the several views, A represents a bolt threaded at one end $a$, and headed at its opposite end $a'$, as usual, the threaded stem of the bolt being provided with a number (three being shown) of elongated key-seats B, closed at their ends $b$, for a purpose as will presently appear.

Instead of forming the bolt and nut in this instance so that the nut will thread directly onto the bolt, as customary, I form the nut C with an enlarged threaded bore $c$ to enable the introduction of a sleeve D between the bolt A and nut C, said sleeve being interiorly threaded for engagement with the threaded end $a$ of the bolt A, and exteriorly threaded for engagement with the threaded bore $c$ of the nut C. The sleeve D is screwed upon the bolt A to its proper position, where the two are secured against independent rotation and against relative longitudinal movement by locking keys E inserted in the key-seats B, and extending outwardly through the complementary elongated openings $e$ in the sleeve. The nut C is screwed on over the sleeve D in closing the key ways in the sleeve and when forced home the nut is held in engagement with the screw-threaded sleeve, and it will be readily seen that the sleeve is of such thickness that the diameter of the nut receiving portion is materially increased beyond the diameter of the bolt, the provision of this sleeve preventing the stripping of the threads on the bolt when stress is placed upon the nut.

From the foregoing description, it will be appreciated that in a simple and cheap manner, I have provided a bolt and nut device of a strong, durable character and capable of performing, with the desired efficiency, the purposes for which the same is intended.

While I have herein disclosed a single special embodiment of the invention, it will be understood by persons skilled in the art that the invention is capable of embodiment in other forms and devices, as may be comprehended by the appended claims.

I claim:—

1. A nut and bolt structure comprising a bolt, a sleeve arranged thereon, a key way in said bolt, a key way in the sleeve registering with the key way in the bolt, a locking pin positioned in said key ways whereby relative movement of the bolt and sleeve is prevented, and a nut positioned on said sleeve and adapted to overlie the locking key, the sleeve being of a thickness whereby the diameter of the nut receiving portion of the structure is materially increased beyond the diameter of the bolt.

2. A nut and bolt structure comprising a threaded bolt, a sleeve interiorly and exteriorly threaded, the threaded portion of the bolt receiving said sleeve, a key way in the bolt, a key way in the sleeve registering with the key way in the bolt, a locking key in said key ways, and a nut threaded on the exterior threads of the sleeve adapted to overlie and inclose the locking key, the sleeve being of a thickness whereby the diameter of the nut receiving portion of the structure is materially increased beyond the diameter of the bolt.

In testimony whereof I affix my signature in presence of two witnesses.

THOMAS $\overset{\text{his}}{\times}$ MILLER.
mark

Witnesses:
F. J. BRADDOCK,
H. P. NORTH.